No. 776,196. PATENTED NOV. 29, 1904.
W. T. NICHOLLS.
GLASS MELTING FURNACE.
APPLICATION FILED DEC. 12, 1903.

NO MODEL. 2 SHEETS—SHEET 1.

WITNESSES
INVENTOR
William T. Nicholls

No. 776,196. PATENTED NOV. 29, 1904.
W. T. NICHOLLS.
GLASS MELTING FURNACE.
APPLICATION FILED DEC. 12, 1903.
NO MODEL. 2 SHEETS—SHEET 2.

WITNESSES
INVENTOR
William T. Nicholls

No. 776,196. Patented November 29, 1904.

UNITED STATES PATENT OFFICE.

WILLIAM T. NICHOLLS, OF WELLSBURG, WEST VIRGINIA.

GLASS-MELTING FURNACE.

SPECIFICATION forming part of Letters Patent No. 776,196, dated November 29, 1904.

Application filed December 12, 1903. Serial No. 184,870. (No model.)

*To all whom it may concern:*

Be it known that I, WILLIAM T. NICHOLLS, of Wellsburg, Brooke county, West Virginia, have invented a new and useful Glass-Melting Furnace, of which the following is a full, clear, and exact description, reference being had to the accompanying drawings, forming part of this specification, in which—

Figure 1:
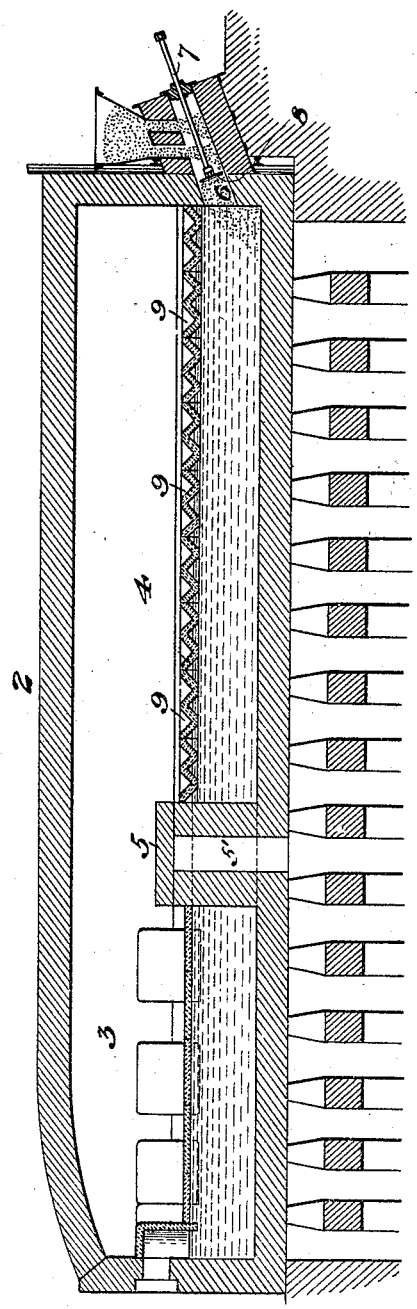
Figure 3:
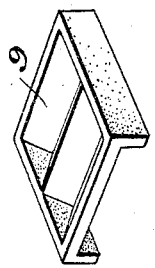
Figure 2:
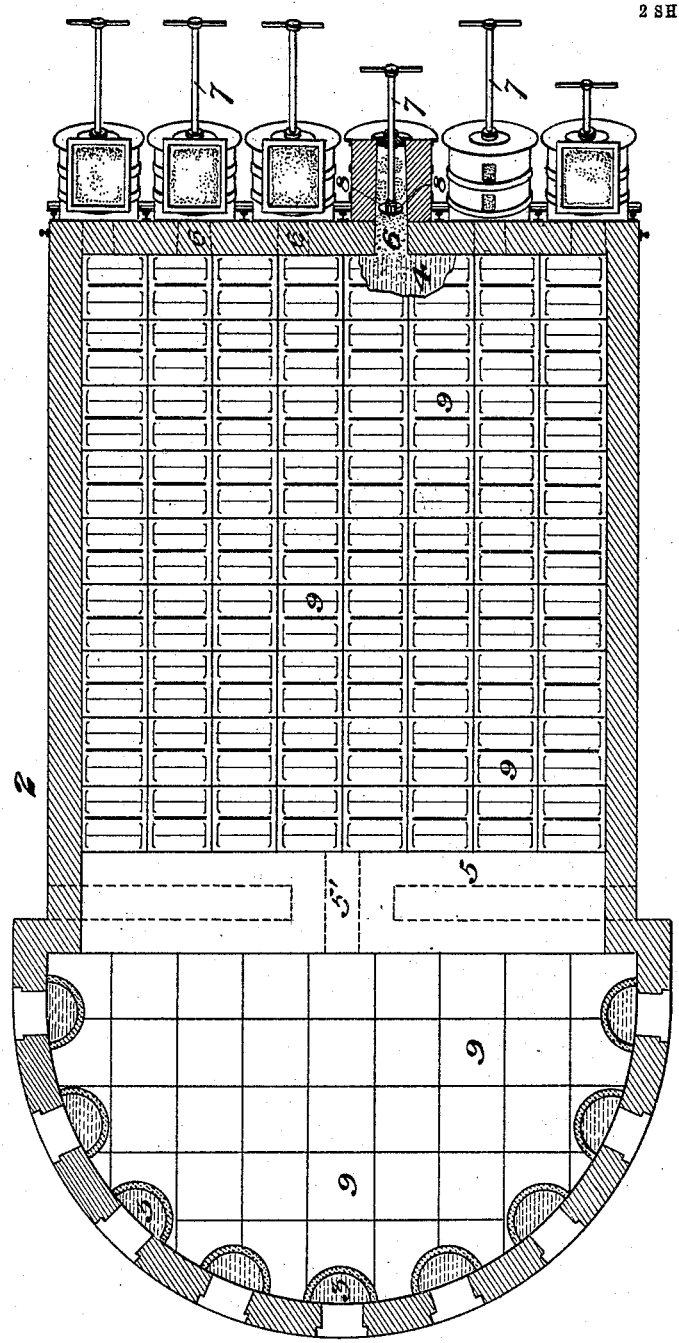

Figure 1 shows in vertical longitudinal section a glass-melting tank operated in accordance with my invention. Fig. 2 is a sectional plan view thereof, and Fig. 3 is a detail view showing one of the floating tiles in the melting-chamber.

The most economical way of melting glass is to employ a regenerative glass-melting tank in which the glass is melted and maintained in fusion by gas-flame passing over an open tank; but difficulty has been experienced in the operation of such tanks in that the chemical action of the fuel-gases is apt to deteriorate the quality of the glass, so that tank-made glass is not equal in quality to glass which is melted in pots. The difficulty attending the use of pots is their great cost and the necessity for frequently renewing them. Pots are also objectionable on account of the slowness of the melting of the glass in them. They require to be worked intermittently—that is to say, a batch which has been melted in a pot is drawn therefrom as required, and the pot must then be recharged with cold material. The tank, on the contrary, is a continuously-operated device.

The purpose of my invention is to provide means by which the advantages of the tank in economy and continuity of working are retained and at the same time glass is produced therefrom equal in quality to that which is made by melting in pots.

My invention consists in melting the glass in a tank and shielding its surface by covering it with floating tiles or refractory plates, which shield the glass from contact with the furnace-gases, and thus prevent the harmful chemical effect of the latter. The tiles are preferably applied to the glass after the tank has been charged by melting down the batch therein, or, if desired, the tiles may be applied to a charge of cullet in the tank before the cullet is melted and the melting effected by heating through the tiles. The operation of the tank is carried on continuously, fresh batch material being fed thereinto from time to time as required.

In the accompanying drawings, 2 represents a glass-tank having a working-out end or chamber 3 and a melting end or chamber 4, separated in the usual way by a bridge-wall 5, with a passage 5' for the flow of the melted glass from the melting end to the working-out end.

6 6 are openings for the introduction of the batch material and cullet. These extend through the furnace-wall into the melting-chamber, and, if desired, they may be provided with plungers 7 or like feeding devices for introducing the batch forcibly into the chamber. These plungers are preferably constructed as shown in Fig. 2, having hinged end portions 8 8, which on the instroke of the plungers operate to push the batch material inwardly and on the outstroke of the plungers yield, so that they will pass the material which is introduced in their rear.

9 9 are the floating tiles with which the surface of the glass is covered and by which the glass is shielded from the chemical action of the flame which passes through the tank. The flame passing over the tiles communicates the heat through them to the glass below, and the tiles act, as above stated, to shield the glass from the action of the flame. The tiles are preferably corrugated to increase the effective heating-surface. They may be made of any suitable quality of fire-clay, it being necessary only that they shall be sufficiently refractory to withstand the heat.

In the drawings I show the tile applied to the glass both in the melting-chamber and the working-out chamber. This is preferable; but my invention, broadly considered, is not limited thereto. I prefer to use corrugated tiles in the melting-chamber and flat tiles in the working-out chamber; but I may use the same tiles in both, either plain or corrugated.

Within the scope of my invention as defined in the claims the apparatus may be modified in various ways. The shape and construction of the tiles may be changed, and the tile covering may be used with furnaces of various types, since

What I claim is—

1. A glass-melting furnace having means for passing flame and gases therethrough, and a refractory shield floating on the surface of the glass-bath, the shield being held against floating out of the furnace; substantially as described.

2. A glass-melting tank-furnace having means for passing flame and gases therethrough, and refractory tiles floating on the glass-bath and protecting the glass from the action of the flame, the tiles being retained against floating out of the furnace; substantially as described.

3. A glass-melting tank-furnace having means for passing flame and gases therethrough, a refractory shield floating on the surface of the glass-bath, the shield being held against floating out of the furnace, and means for delivering batch material to the tank; substantially as described.

4. A glass-melting tank-furnace having means for passing flame and gases therethrough, a series of refractory tiles floating on the surface of the glass-bath, the tiles being retained against floating out of the furnace, and means for delivering the batch material to the glass-bath below the level of the said tiles; substantially as described.

5. A glass-melting tank-furnace having means for passing flame and gases therethrough, and refractory tiles floating on the surface of the glass-bath and protecting it from the action of the flame, the tiles being retained against floating out of the furnace, and having projecting portions to increase the heating-surface; substantially as described.

In testimony whereof I have hereunto set my hand.

WILLIAM T. NICHOLLS.

Witnesses:
 JOHN MILLER,
 H. M. CORWIN.